(12) United States Patent
Beraldo

(10) Patent No.: US 6,959,904 B2
(45) Date of Patent: Nov. 1, 2005

(54) SOLENOID VALVE DEVICE OF THE BISTABLE TYPE, PARTICULARLY FOR CONTROLLING THE SUPPLY OF WATER TO A WASHING MACHINE

(75) Inventor: Danilo Beraldo, Collegno (IT)

(73) Assignee: Elbi International S.p.A., Turin (Italy)

( * ) Notice: Subject to any disclaimer, the term of this patent is extended or adjusted under 35 U.S.C. 154(b) by 3 days.

(21) Appl. No.: 10/445,051

(22) Filed: May 27, 2003

(65) Prior Publication Data

US 2004/0051064 A1 Mar. 18, 2004

(30) Foreign Application Priority Data

May 27, 2002 (IT) ................................... TO2002A0447

(51) Int. Cl.[7] ............................................. F16K 31/12
(52) U.S. Cl. ..................... 251/30.03; 251/38; 251/45
(58) Field of Search .............................. 251/30.03, 38, 251/45, 46, 65, 129.15; 361/170, 178, 187, 154

(56) References Cited

U.S. PATENT DOCUMENTS

| | | | | |
|---|---|---|---|---|
| 5,113,892 A | * | 5/1992 | Hull et al. | ..................... 137/62 |
| 5,622,351 A | * | 4/1997 | Kim | ........................ 251/30.03 |
| 6,076,550 A | * | 6/2000 | Hiraishi et al. | ............. 137/550 |

* cited by examiner

*Primary Examiner*—Edward K. Look
*Assistant Examiner*—John K. Fristoe, Jr.
(74) *Attorney, Agent, or Firm*—Sughrue Mion, PLLC

(57) ABSTRACT

The device comprises: a solenoid valve of the bistable type controlled by means of an operating winding; a control circuit coupled for operation to a power supply source and capable of supplying to the operating winding of the solenoid valve a first and a second current pulse, for opening and closing the solenoid valve respectively; and a detecting and operating device associated with the said solenoid valve, capable of detecting a predetermined dangerous operating condition thereof, and of causing, in such a case, the automatic reclosing of the valve for cutting off the flow of the fluid.

5 Claims, 5 Drawing Sheets

SOLENOID VALVE DEVICE OF THE BISTABLE TYPE, PARTICULARLY FOR CONTROLLING THE SUPPLY OF WATER TO A WASHING MACHINE

BACKGROUND OF THE INVENTION

The present invention relates to a device for controlling the flow of a fluid, and particularly for controlling the supply of water to a washing machine, such as a washing machine for laundry or a dishwasher.

More specifically, the invention relates to a device comprising a solenoid valve of the bistable type, controlled by an operating winding, and circuit means connected for operation to an electrical power source such as the electrical mains, and capable of supplying to the winding of the said solenoid valve a first and a second current pulse for opening and closing the said solenoid valve respectively.

The use of solenoid valves of the bistable type is widespread, particularly because of their low energy consumption. This is because a brief pulse is sufficient to open such a device, and another brief pulse is sufficient to subsequently close it. In the time interval between these first and second pulses, the bistable solenoid valve is not energized, and therefore does not consume any energy.

SUMMARY OF THE INVENTION

The object of the present invention is to provide a solenoid valve device for controlling the flow of a fluid, particularly for controlling the supply of water to a washing machine, which overcomes some problems encountered in the operation of devices using solenoid valves of the bistable type. This and other objects are achieved according to the invention with a device whose principal characteristics are for controlling the flow of a fluid in a domestic electrical appliance, particularly for controlling the water supply to a washing machine.

Further characteristics and advantages of the invention are shown clearly in the following detailed description, provided purely by way of example and without restrictive intent, with reference to the attached drawings, in which:

DETAILED DESCRIPTION OF THE INVENTION

Figure 1:
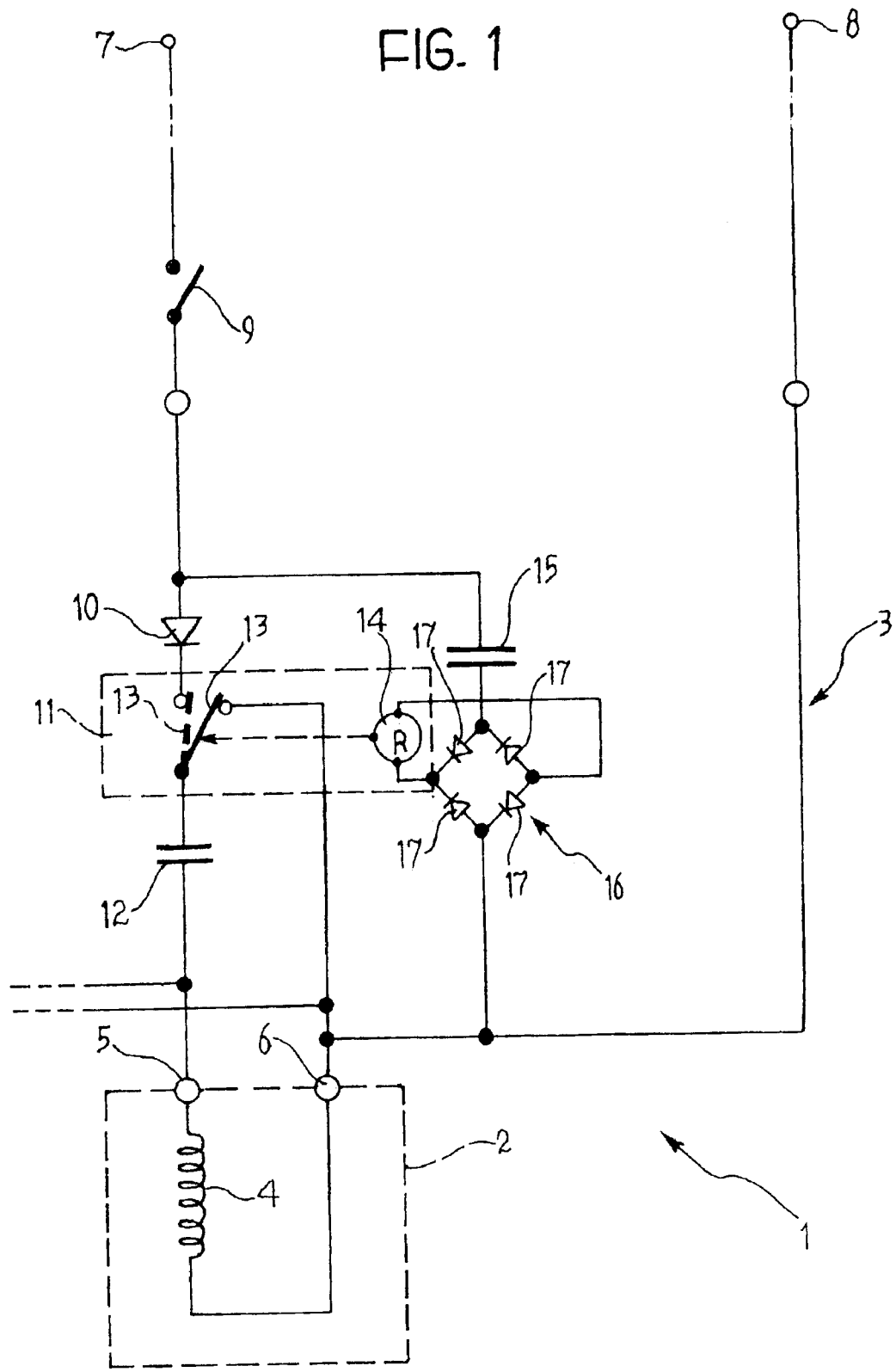
FIG. 1 is a circuit diagram of a first embodiment of a device according to the invention.

In the drawings, the number 1 indicates the whole of a device for controlling the flow of a fluid, particularly for controlling the supply of water to a washing machine, made according to the present invention.

With particular reference to the diagram in FIG. 1, a device 1 according to the invention comprises a solenoid valve 2 of the bistable type, connected to an electrical power supply and control circuit indicated as a whole by 3.

The bistable solenoid valve 2 itself comprises an operating winding 4, connected to two terminals 5 and 6 of the circuit 3.

Also with reference to FIG. 1, the circuit 3 has two further terminals 7 and 8, designed to be connected to an electrical power source, particularly to the alternating current mains.

The terminal 7 of the circuit 3 is connected to the terminal 5 through a normally open switch 9, a rectifier diode 10, a switching device indicated as a whole by 11, and a capacitor 12.

The switch 9, which can be, for example, a solid state switch or an electromechanical switch, is controlled in a known way, for example by means of an electronic unit which is not illustrated, or by what is known as a "timer", to cause the opening of the bistable solenoid valve 1.

In the illustrated example of embodiment, the switching device 11 is of the electromechanical type, and comprises a moving contact 13 controlled by a winding or coil 14. The moving contact 13 is normally in the position shown in broken lines in FIG. 1, in which it connects the cathode of the diode 10 to the capacitor 12. When the winding 14 is energized, the moving contact 13 moves to the position shown in solid lines, in which it connects the capacitor 12 to the terminal 6 of the circuit 3; in other words it connects the capacitor 12 directly to the operating winding 4 of the bistable solenoid valve 2.

The circuit 3 comprises a further capacitor 15 connected between the anode of the diode 10 and a double half-wave rectifier circuit 16. In the illustrated example of embodiment, the rectifier circuit 16 comprises four diodes 17 in a quadrilateral arrangement, in the configuration also known as a Graetz bridge. One end of a diagonal of this bridge circuit is connected to the capacitor 15 and the other end is connected to the terminal 6. The energizing winding 14 of the switch 11 is connected in parallel with the other diagonal of this bridge circuit.

The power supply terminal 8 of the circuit 3 is connected to the output terminal 6.

Figure 2:
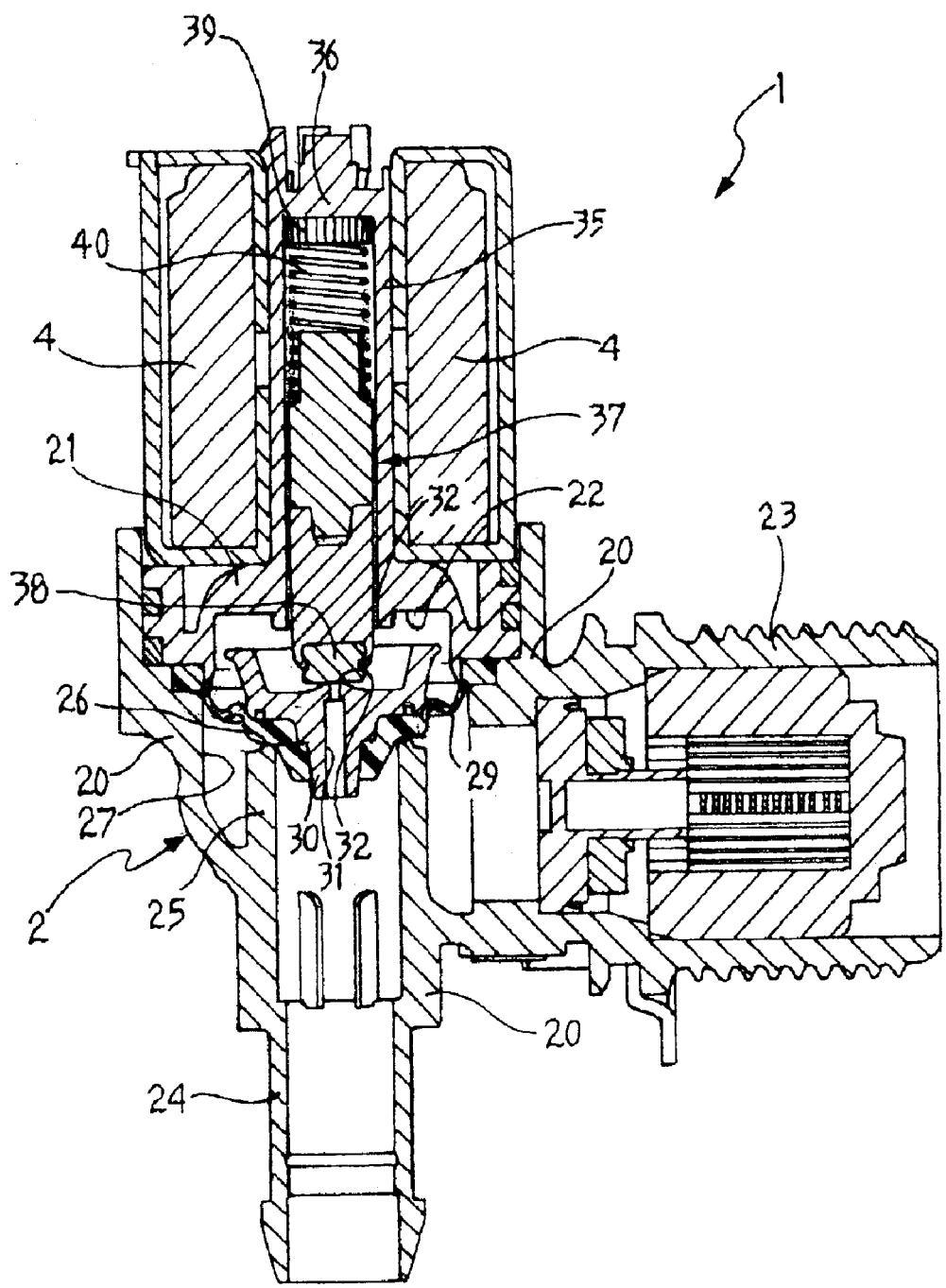
FIG. 2 is a partial sectional view of a bistable solenoid valve.
Figure 2A:
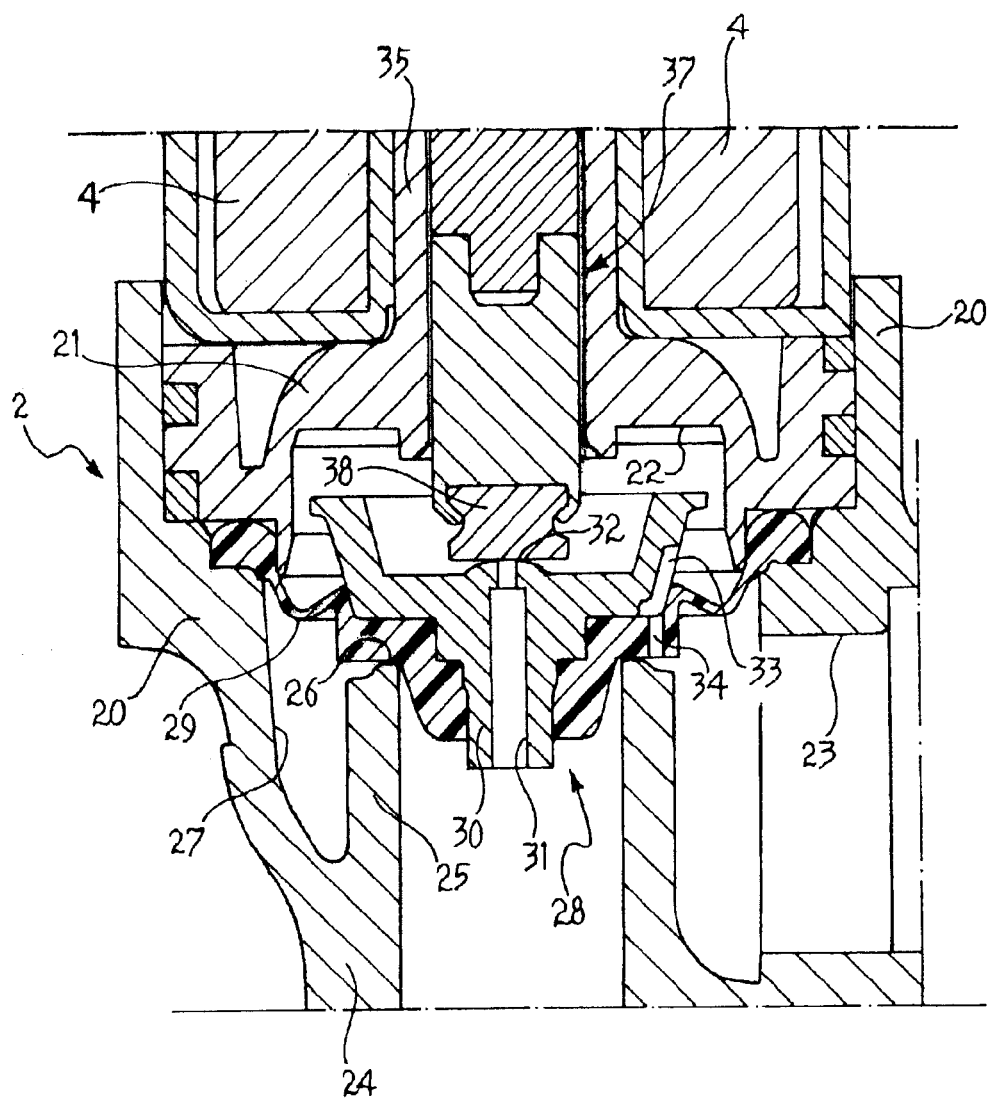
FIG. 2a is a partial view which shows a detail of FIG. 2 on an enlarged scale.
Figure 4:
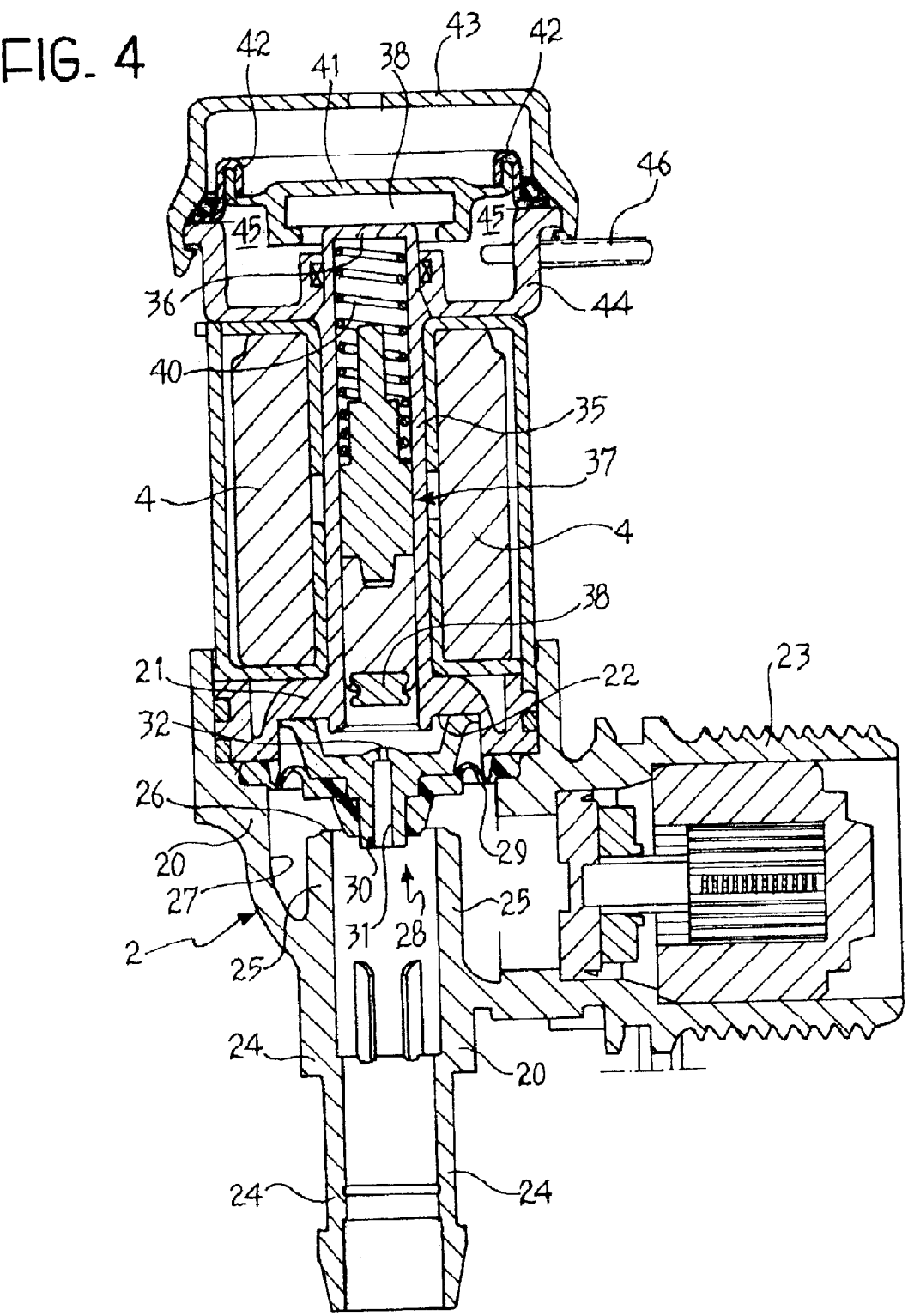
FIG. 4 is a partial sectional view of a bistable solenoid valve included in a second embodiment of a device according to the invention.

In the example of embodiment shown in FIGS. 2, 2a and 4, the bistable solenoid valve 2 comprises a structure including two shaped bodies, namely a lower body 20 and an upper body 21, joined in a watertight way to form a chamber 22 between them.

The lower body 20 forms an inlet connector 23 and an outlet connector 24. The latter is connected in its part facing the chamber 22 to an annular wall 25 whose top edge 26 can act as a valve seat.

Inside the lower body 20 and around the annular wall 25 there is formed an inlet passage 27, which is also annular and which communicates with the inlet connector 23.

The number 28 indicates the whole of a main plug, comprising a flexible annular membrane 29, whose peripheral edge is gripped between the bodies 20 and 21, and a rigid body 30 pierced by an axial passage 31, whose upper termination forms a valve seat 32.

The plug 28 is designed to interact, in the way which is described more fully below, with the valve seat 26.

As shown in particular in FIG. 2a, passages 33 and 34, by means of which the chamber 22 can communicate with the inlet connector 23 when the solenoid valve 2 is closed, are formed in the body 30 and in the thickened central portion of the membrane 29 (FIGS. 2 and 2a).

The plug 28, as described more fully below, can interact with the valve seat 26 to control the flow of liquid between the annular inlet passage 27 and the outlet connector 24.

The upper part of the body 21 forms a tubular receptacle 35 closed at its top by an end wall 36.

The operating winding 4 of the bistable solenoid valve 2 is positioned around the said tubular receptacle 35. A core 37 is mounted in an axially slidable way in this receptacle, this core being made at least partially of ferromagnetic material and having in its lower part an auxiliary plug 38 which can interact with the valve seat 32 formed in the rigid body 30, forming a pilot valve with the said seat.

A permanent magnet 39 is fixed to the terminal wall 36 of the receptacle 35.

Figure 3:
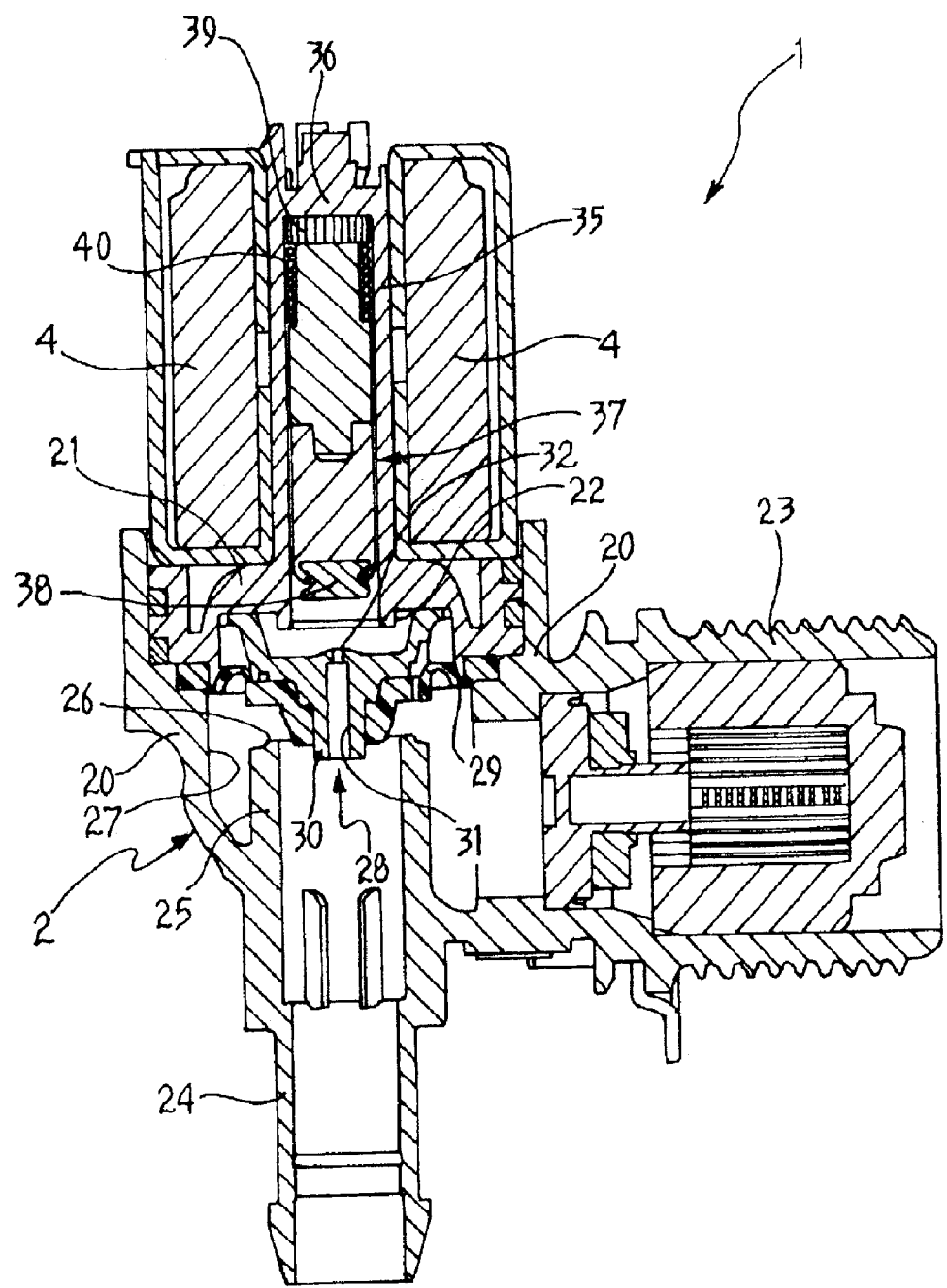
FIG. 3 is a view similar to that of FIG. 2, showing the bistable solenoid valve in the open condition.

A coil spring 40 is positioned between this permanent magnet and the moving core 37, and tends to push the latter downwards, in such a way that its plug closes the seat 32 (FIGS. 2 and 2a), against the action of the magnet 39 which would tend to keep the core in the raised position (FIG. 3).

The solenoid valve described above operates essentially in the following way.

In FIG. 2, the solenoid valve 2 is shown in the closed condition. In this condition, the plug 28 closes the valve seat 26. Under the action of the spring 40, the moving core 37 is in the lowered position in which its plug 38 closes the valve seat 32. The chamber 22 is filled with liquid which has flowed into it previously from the inlet connector 23, through the passages 33 and 34 of the plug 28. The pressure acting on the upper face of the plug 28 is greater than that acting on its lower surface or face, and the plug therefore presses on the valve seat 26.

When the winding 4 is energized by a first pulse of current flowing in a predetermined direction, the magnetic field developed as a result overcomes the force of the spring 40 and causes the moving core 37 and the associated plug 38 to move upwards to the position shown in FIG. 3. In this condition, the attractive force exerted by the magnet 39 on the moving core 37 is sufficient in itself to retain this moving core and the plug 38 in the raised position. Thus, when the first energizing pulse ceases, the core 37 and the plug 38 remain in the raised position. The liquid contained in the chamber 22 can then flow through the passage 31 towards the outlet connector 24. The consequent pressure drop in the chamber 22, and the simultaneous action of the pressure exerted by the inflowing liquid on the lower face of the plug 28, cause the latter to rise from the valve seat 26, as shown in FIG. 3, and the flow of liquid supplied to the inlet connector 23 can thus pass directly to the outlet connector 24 through the said valve seat and the tubular wall 25.

When the bistable solenoid valve 2 is to be closed, a second current pulse must be sent to the winding 4, in the opposite direction to the direction of the first current pulse. This second pulse can be sent in a known way to the winding 4 by an electronic control unit which is not shown in FIG. 1. The magnetic field generated in this way now acts on the moving core 37 in conjunction with the spring 40, in such a way that it overcomes the retaining force exerted on the said moving core 37 by the permanent magnet 39. The plug 38 closes the valve seat 32, and the liquid which flows from the inlet connector 23 to the chamber 22 through the passages 33 and 34 no longer finds an outlet and gradually increases the pressure acting on the upper face of the plug 28, until this plug returns to a position of engagement with the valve seat 26. Thus the flow of liquid between the inlet connector 23 and the outlet connector 24 is cut off.

With the bistable solenoid valve 2 described above, the following problem may arise. If the mains power is cut off while the solenoid valve 2 is open (with the winding 4 de-energized after the first opening pulse), the solenoid valve 2 remains in the open condition, potentially for an indeterminate time. This can entail the risk of flooding of the domestic appliance with which the solenoid valve 2 is associated for controlling its filling with water from the water mains.

This problem can be overcome by means of the solution described above with reference to the electrical circuit diagram of FIG. 1. With reference to this figure, the power supply circuit 3 comprises the capacitor 12 which is designed to act as a source of auxiliary voltage during operation.

When the switch 9 is closed, the energizing winding 14 of the switch 11 is energized, and causes the moving contact 13 to move from the position shown in solid lines to the position shown in broken lines. The positive half-waves of current can then flow towards the capacitor 12 and the operating winding 4 of the solenoid valve 2. The capacitor 12, which is initially discharged, acts initially as a short circuit. The operating winding 4 is energized, and the bistable solenoid valve 2 is opened. As soon as the capacitor 12 has been charged, it acts essentially as an open circuit, and disconnects the winding 4 of the solenoid valve 2 from the power supply terminals 7 and 8, and therefore from the mains.

If the supply voltage at the terminals 7 and 8 of the circuit 3 is cut off while the solenoid valve 2 is open, the winding 14 of the switch 11 is de-energized, and the moving contact 13 moves to the position shown in solid lines in FIG. 1. The capacitor 12 is then coupled directly to the winding 4 of the solenoid valve 2, and is discharged into it, causing a current pulse to flow through it, in the opposite direction to the direction of the preceding current pulse, and, by the discharge of the charge stored in the capacitor 12, causes the solenoid valve 2 to close automatically.

By this means, the problem of bistable solenoid valves described above is easily overcome.

It should be noted that any other auxiliary voltage source can be used in place of the capacitor 12. Furthermore, any other known switch device, particularly a solid-state electronic switch, can be used in place of the electromechanical switch 11 described above.

With the circuit described above, if the supply voltage applied to the terminals 7 and 8 is cut off while the bistable solenoid valve 2 is closed, the circuit 3 again operates in the way described above, and the current pulse flowing in the winding 4 as a result of its coupling to the capacitor 12 has no practical effect, since the solenoid valve is already closed.

FIG. 4 shows a variant embodiment. In this figure, the same reference numbers are given to parts and elements described previously.

In the embodiment according to FIG. 4, the permanent automatic retention magnet 39 is positioned not inside the tubular receptacle 35 but outside it, and is carried by a central formation 41 of a membrane 42 whose peripheral edge is gripped in a watertight way between an upper half-shell 43 and a lower half-shell 44 forming in combination a capsule connected in a watertight way to the upper end of the tubular receptacle 35.

Between the membrane 42 and the lower half-shell 44 there is formed a chamber 45 of variable volume, which can be made to communicate with the washing chamber of a washing machine by means of a connector 46 and a tube (not shown) which passes into the said washing chamber. The arrangement is such that, during operation, as the water level rises in the washing chamber of the domestic appliance with which the solenoid valve 2 is associated, the air pressure in the chamber 45 of the capsule 43, 44 increases. When the level in the washing chamber exceeds a predetermined danger level, the air pressure in the chamber 45 can cause the raising of the membrane 42 and the associated permanent magnet 39.

The solenoid valve device of FIG. 4 essentially operates in the following way.

As long as the water level in the washing chamber of the domestic appliance with which the solenoid valve 2 is associated remains below the aforesaid threshold, the permanent magnet 39 is adjacent to the terminal wall 36 of the receptacle 35. In this condition, it can act as a retaining element to hold the moving core 37 and the plug 38 in their raised position when the solenoid valve is open and the initial current pulse (which has caused it to open) has ceased.

If the mains power is cut off while the bistable solenoid valve 2 is open, the valve remains open and the water level in the washing chamber continues to rise. As soon as this level reaches the hazard or danger level specified above, the air pressure in the chamber 45 causes the permanent magnet 39 to rise. The action of the spring 40 is then sufficient to cause the moving core 37 and the plug 38 to return to the lowered position in which the valve seat 32 is closed. This causes the solenoid valve 2 to close, cutting off the flow of liquid between its inlet connector 23 and its outlet connector 24 essentially as described above.

The solution described above with reference to FIG. 4 is moreover capable of automatically closing the solenoid valve 2 not only after an interruption of the power supply and the reaching of a danger level by the liquid in the washing chamber. This is because the solution shown in FIG. 4 enables the solenoid valve 2 to be closed automatically even when the supply voltage is present, for example if there is an accidental interruption of the circuit between the supply terminals and the operating winding 4 of the solenoid valve, or an interruption of the continuity of this winding. In such a case, the winding 4 would not be able to receive the energizing pulse or pulses for closing the solenoid valve. However, as soon as the water level in the washing chamber exceeds the predetermined danger threshold, the permanent magnet 39 will still be raised, thus causing the automatic closing of the solenoid valve.

Clearly, provided that the principle of the invention is retained, the forms of its embodiment and the details of construction, which have been described and illustrated purely by way of example and without restrictive intent, can be varied considerably without departure from the scope of the invention as defined in the attached claims.

What is claimed is:

1. Device for controlling the flow of a fluid in a domestic electrical appliance, particularly for controlling the water supply to a washing machine, comprising:
    a solenoid valve of the bistable type controlled by means of an operating winding;
    circuit means coupled for operation to a power supply source and capable of supplying to the operating winding of the said solenoid valve at least a first and at least a second current pulse, for opening and closing, respectively, the said solenoid valve; and
    detecting and operating means associated with the said solenoid valve, capable of detecting a predetermined dangerous operating condition thereof, and of causing, in such a case, automatic reclosing of the valve for cutting off the flow of the said fluid,
    wherein in which the said circuit means comprise auxiliary energy storage means, and the said detecting and operating means are designed to detect the occurrence of a condition of interruption of the power supply from the aforesaid source, and to cause, in such a case, the coupling of the auxiliary energy storage means to the operating winding of the said bistable solenoid valve, in such a way that a current is applied to the said winding in the direction which causes the closing of the solenoid valve,
    wherein in which the said power source is an alternating current source, and the said auxiliary energy storage means comprise a capacitor connected essentially in series to the operating winding of the said bistable solenoid valve and capable of being coupled to the said alternating current power source through first rectifier means, and in which the said detecting and operating means comprise an electrical or electronic switch coupled to the said voltage source and capable of assuming:
        a first condition in which the said capacitor and the operating winding of the bistable solenoid valve can be coupled to the alternating current voltage source through the said (first) rectifier means, and
        a second condition in which it causes the said capacitor to be coupled to the terminals of the operating winding of the bistable solenoid valve in such a way that the said capacitor can discharge into the said winding.

2. Device according to claim 1, in which the said bistable solenoid valve comprises:
    a main hydraulic valve associated with a pilot solenoid valve which comprises the aforesaid operating winding;
    the main hydraulic valve comprising a body in which there is formed, between an inlet connector and an outlet connector for the fluid, a main valve seat which is normally closed by a membrane plug having a passage which allows fluid to flow from the inlet connector to a control chamber downstream from the said plug;
    the pilot solenoid valve including a second valve seat formed in a first member, positioned between the control chamber and the outlet connector and normally closed by a second plug moving in the control chamber and associated with a second moving member which is made from magnetic material and which is movable from a rest position to an operating position by means of a first energizing of the operating winding against the action of opposing elastic means, to cause the opening of the pilot solenoid valve;
    the said second moving member being associated with retention means which are capable of retaining it in the said operating position in which the pilot solenoid valve is open, against the action of the said elastic means, as long as the operating winding remains de-energized after the said first energizing, and capable of enabling it to return to the rest position as a result of a second energizing of the said winding produced by supplying to this winding a current in the opposite direction to the direction of the first energizing.

3. Device according to claim 2, in which the said retention means comprise a permanent magnet.

4. Device according to claim 2, for controlling the flow of a hydraulic fluid to an operating chamber of a domestic electrical appliance, such as a washing machine, and in which the said detecting and operating means comprise a chamber of variable volume delimited at least partially by an elastically deformable membrane designed to be exposed in operation to an air pressure which depends directly on the level of the hydraulic fluid in the said operating chamber; the aforesaid permanent magnet being carried by the membrane; the arrangement being such that, when the level of the hydraulic fluid in the said washing chamber exceeds a predetermined level during operation, the membrane causes the permanent magnet to move to a position in which it enables the pilot solenoid valve, and consequently the main valve, to close.

5. Device according to claim 1, in which the said switch comprises a relay including an energizing coil which can be coupled to the said alternating current voltage source through second rectifier means, and a moving contact which, when the coil is energized and de-energized, can assume, respectively, a first and a second position in which it couples a plate of the aforesaid capacitor, respectively, to the source through the first rectifier means, and to the operating winding of the aforesaid solenoid valve.

* * * * *